(12) United States Patent
Cavanaugh (10) Patent No.: US 8,145,904 B2
(45) Date of Patent: *Mar. 27, 2012

(54) SYSTEM AND METHOD FOR NETWORK EDGE DATA PROTECTION

(75) Inventor: Robert E. Cavanaugh, Encinitas, CA (US)

(73) Assignee: Trend Micro Incorporated, Tokyo (JP)

( * ) Notice: Subject to any disclaimer, the term of this patent is extended or adjusted under 35 U.S.C. 154(b) by 82 days.

This patent is subject to a terminal disclaimer.

(21) Appl. No.: 12/550,570

(22) Filed: Aug. 31, 2009

(65) Prior Publication Data

US 2009/0320135 A1    Dec. 24, 2009

Related U.S. Application Data (63) Continuation of application No. 10/727,068, filed on Dec. 3, 2003, now Pat. No. 7,607,010.

(60) Provisional application No. 60/462,201, filed on Apr. 12, 2003.

(51) Int. Cl.
    H04L 29/06    (2006.01)
(52) U.S. Cl. .............. 713/165; 726/22; 726/23; 726/24; 726/25; 726/26; 713/167; 713/188
(58) Field of Classification Search ............... 726/22–26; 713/165, 167, 188
    See application file for complete search history.

(56) References Cited

U.S. PATENT DOCUMENTS

| | | | |
|---|---|---|---|
| 5,319,776 A | 6/1994 | Hile et al. | |
| 5,623,600 A | 4/1997 | Ji et al. | |
| 5,864,683 A | 1/1999 | Boebert et al. | |
| 6,513,122 B1 | 1/2003 | Magdych et al. | |
| 6,732,279 B2 | 5/2004 | Hoffman | |
| 6,772,345 B1 | 8/2004 | Shetty | |
| 6,775,780 B1 | 8/2004 | Muttik | |
| 7,032,005 B2 | 4/2006 | Mathon et al. | |
| 7,058,976 B1 | 6/2006 | Dark | |
| 7,096,501 B2 | 8/2006 | Kouznetsov et al. | |
| 7,203,192 B2 | 4/2007 | Desai et al. | |
| 2002/0199120 A1 | 12/2002 | Schmidt | |

OTHER PUBLICATIONS

U.S. Appl. No. 09/572,112, Dark.
U.S. Appl. No. 09/875,319, Sharp et al.
U.S. Appl. No. 10/078,386, Sharp et al.
U.S. Appl. No. 60/462,201, Wang.
International Search Report and Written Opinion issued for PCT/US04/10653, dated Mar. 16, 2006.

(Continued)

*Primary Examiner* — Thanhnga B Truong
(74) *Attorney, Agent, or Firm* — Okamoto & Benedicto LLP (57) ABSTRACT

Disclosed are systems and methods which examine information communication streams to identify and/or eliminate malicious code, while allowing the good code to pass unaffected. Embodiments operate to provide spam filtering, e.g., filtering of unsolicited and/or unwanted communications. Embodiments provide network based or inline devices that scan and scrub information communication in its traffic pattern. Embodiments are adapted to accommodate various information communication protocols, such as simple mail transfer protocol (SMTP), post office protocol (POP), hypertext transfer protocol (HTTP), Internet message access protocol (IMAP), file transfer protocol (FTP), domain name service (DNS), and/or the like, and/or routing protocols, such as hot standby router protocol (HSRP), border gateway protocol (BGP), open shortest path first (OSPF), enhanced interior gateway routing protocol (EIGRP), and/or the like.

16 Claims, 2 Drawing Sheets

OTHER PUBLICATIONS

Clifford Sharp, "Response to Plaintiff's Original Petition and Application for Temporary Restraining Order and Injunctive Relief and Request for Summary Judgment"; *Deep Nines, Inc.* v. *Sharp*, No. DV 03-08451D (95th Dist. Ct., Dallas County, Tex. Sep. 2003).

Clifford Sharp, "Cliff's DNI Chronicles"; Nov. 10, 2002; pp. 1-9; Dallas, Texas; McAfee, Marked as Trial Exhbit No. 0016, Dallas, TX. "Defendant McAffee, Inc.'s Third Amended Answer and Counterclaims to Plaintiff's First Amended Complaint and Jury Demand," *Deep Nines Inc.* v. *McAfee, Inc*., No. 9:06-CV-174-RC (United States District Court for the Eastern District of Texas, Lufkin Division, May 8, 2008), pp. 1-27.

Office Action issued for Japanese Patent Application No. 2003-501,888, 4 pages (English Language translation 4 pages).

Supplementary European Search Report issued for European Patent Application No. 04 74 9829, dated Mar. 24, 2009, 3 pages.

USPTO Office Action for U.S. Appl. No. 10/727,068, mailed Apr. 2, 2007, response filed Oct. 2, 2007.

USPTO Office Aciton for U.S. Appl. No. 10/727,068, mailed Dec. 11, 2007, response filed Jun. 6, 2008.

USPTO Final Office Aciton for U.S. Appl. No. 10/727,068, mailed Sep. 2, 2008, Notice of Appeal filed Feb. 2, 2009, Appeal brief filed Mar. 31, 2009.

FIG. 2

SYSTEM AND METHOD FOR NETWORK EDGE DATA PROTECTION

CROSS-REFERENCE TO RELATED APPLICATIONS

This application is a continuation of U.S. patent application Ser. No. 10/727,068 filed Dec. 3, 2003 and entitled "SYSTEM AND METHOD FOR NETWORK DATA EDGE PROTECTION," and priority is hereby claimed to U.S. Provisional Patent Application No. 60/462,201 filed Apr. 12, 2003 and entitled "SYSTEM AND METHOD FOR NETWORK EDGE DATA PROTECTION," the disclosures of which are hereby incorporated herein by reference. The present application is related to co-pending and commonly assigned U.S. patent application Ser. No. 09/572,112 filed May 17, 2000 and entitled "INTELLIGENT FEEDBACK LOOP PROCESS CONTROL SYSTEM;" U.S. patent application Ser. No. 09/875,319 filed Jun. 6, 2001 and entitled "SYSTEM AND METHOD FOR TRAFFIC MANAGEMENT CONTROL IN A DATA TRANSMISSION NETWORK;" and U.S. patent application Ser. No. 10/078,386 filed Feb. 20, 2002 and entitled "SYSTEM AND METHOD FOR DETECTING AND ELIMINATING IP SPOOFING IN A DATA TRANSMISSION NETWORK," the disclosures of which are incorporated herein by reference.

TECHNICAL FIELD invention relates generally to information communication and, more particularly, to monitoring network communications for detection and/or deletion of undesirable information, such as may contain viruses, Trojans, worms, and/or the like.

BACKGROUND OF THE INVENTION

Information communication has proliferated in recent years with the nearly ubiquitous adoption of computer systems and networks, such as local area networks (LANs), metropolitan area networks (MANs), wide area networks (WANs), intranets, extranets, the Internet, etcetera, in both personal and business applications. Accordingly, various computer programs and systems have been developed to facilitate such information communication. For example, EXCHANGE and OUTLOOK software programs, available from Microsoft Corporation, provide electronic mail servers and electronic mail clients, respectively, which are used widely by businesses and individuals. Software programs such as GROUPWISE, available from Novell, Inc., and LOTUS NOTES, available from International Business Machines, Inc., also provide electronic mail clients for use by businesses and individuals.

Information communication systems, such as those utilizing the above mentioned software programs, often implement features for simplifying communication tasks for the user, such as by automating particular features and tasks. For example, OUTLOOK will, in its default configuration, automatically execute Visual Basic attachments and basic script attachments to mail messages when the associated mail message is opened. Most users will not reconfigure their mail client, such as OUTLOOK, not to automatically execute such attachments, particularly if using Visual Basic scripts in electronic mail is a normal part of their business process, as doing so makes their business process more difficult and time consuming to implement because they have to explicitly execute such attachments.

Mail clients, such as OUTLOOK, also include features which allow certain types of attachments to exploit automatic execution features without a user opening or otherwise accessing an associated mail message. Such features are very convenient in that a user is not required to manually select and initiate execution of particular attachments.

However, miscreants have taken advantage of the widespread availability of information communication networks, automated features of information communication systems, the relative naivete users, and/or the inability of system administrators to detect and quickly react to malicious behavior to spawn innumerable attacks on information communication systems. For example, certain messages, such as electronic mail messages, can contain executable code that, while normally such code serves a useful function, exploits the trust that is involved by introducing malicious code that adversely affects the operation of network systems. Such malicious code is often in the form of embedded Java script or Visual Basic scripts that exploit weaknesses in electronic mail clients and electronic mail servers to generate floods of electronic mails or infect the client and/or server host with code that leads to some type of security vulnerability or destructive operation. Many users believe that opening an electronic mail is harmless or that the system should take care of an potential malicious code, so they open electronic mail messages not knowing any better or not caring, and pretty soon an infection starts.

Common types of such malicious code include viruses, Trojans, and worms. A virus, for example, is often in the form of an electronic mail attachment which is received contaminated, e.g., the mail message attachment already contains an infectant and is contagious. The virus itself will often be hosted by an electronic mail message from a trusted source, such as a friend or acquaintance, and will utilize the automated features of the user's mail client to propagate new infected mail messages directed to each entry in the user's mail client address list. Propagation in this manner is similar to an organic virus, such as the common cold, spreading as quickly as it comes into contact with others. A worm will typically be introduced into a network again in the same way as the virus described above. For example, a worm may be carried as an electronic mail attachment or embedded in a file. However, a worm is often more difficult to detect as it is often transmitted as pieces of code that collect themselves for reassembly and operation. A worm generally will operate to create a destructive pathway out of an infected system to other systems, such as through an electronic mail address book, file transfer protocol (FTP), hypertext transfer protocol (HTTP), etcetera, to carry information and/or establish a porthole (wormhole) out of the host system. A Trojan is typically a piece of code that that is hidden or buried within a file or an electronic mail that sits resident and dormant on an infected computer system waiting to be activated for destructive operation. For example, a Trojan can be time activated, it can be called through a remote command, etcetera, and when activated the infected system may start acting on its own to attack other systems or operations. In contrast to the typical virus, which reacts very rapidly and spreads almost immediately, a Trojan can sit resident and dormant for a very long time, reacting when called upon or otherwise triggered.

Malicious code, such as the aforementioned viruses, Trojans, and worms, may operate to provide certain functions to the progenitor of the code, such as to allow that person to get access to the infected machine. For example, a Trojan may be implemented for creating a special telnet connection that only the creator of the Trojan code is aware of in order to allow them to log onto an infected computer. Alternatively, a Trojan might operate to alter a host machine so that the creator of the Trojan can log on legitimately, although they are an illegitimate user. However, other malicious code operates more to propagate its payload. For example, viruses and worms are typically directed to spreading the payload, such as to create a flooding attack.

An example of a malicious code attack might be to attach a file to an electronic mail message, wherein the file appears to be an innocuous word processing (e.g., Microsoft WORD) document, slideshow (e.g., Microsoft POWERPOINT) presentation, or a Visual Basic script that does something useful, but in fact contains code that will for instance send copies of the message to everybody in the electronic mail client address book. When the recipient opens the mail message carrying the attachment, the mail client may automatically execute the attachment, thereby allowing the malicious code to execute and replicate the message with the attachment over and over. Even where the electronic mail client does not automatically execute the attachment, the recipient may unwittingly execute the malicious code believing it to be a useful attachment. The replicated messages may propagate within a particular company's information communication network, and/or may spread to external networks, continuing to be replicated and spread by each new recipient. Unchecked, the message keeps replicating and can bring the mail system down due to the message load, perhaps even seriously affecting or even crashing the entire information communication network.

A specific example of implementation of a malicious code attack asset forth above is the Code Red virus. The Code Red virus was transmitted as an electronic mail attachment, which would infect client machines causing them to spread copies of the electronic mail and its virus to anybody in the infected machine's address book. It would infect the electronic mail server with a piece of malicious code that would launch a flooding attack at a certain time of every month. This particular attack is estimated to have cost hundreds of millions of dollars in lost time to clean up the virus and return the infected systems to normal operation. Moreover, costs due to the Code Red virus continue to mount as the virus keeps coming back, preying on the inexperience of users to continue to spread.

Although the specific examples above have been described with reference to malicious code resulting in flooding type attacks, other attacks may be result from such malicious code. For example, rather than designing a virus to replicate itself and flood the network, such malicious code may be designed to delete hard drive content, to alter system configurations, to cause hardware to be damaged or destroyed, to alter data, and/or the like. However, the current trend appears to be toward the initiation of flooding or denial of service type attacks, as it takes very little sophistication to mount such an attack, the automated features of server and client systems often facilitates such attacks, user naivete can often be relied upon to further the attack, and few effective solutions are implemented to prevent such attacks.

Although most people probably are not malicious or mean spirited, attacks based upon malicious code as described above continue to increase at an alarming rate. This is a problem that started with a very low level of notoriety approximately five years ago and has doubled in the numbers of attacks and the numbers of incidents every year since. The technology and bandwidth available in the information communication networks has fueled the impact of such attacks. For example, it used to take 80 minutes for a malicious code attack to propagate across the Internet, but that time has now been reduced to approximately 4 minutes. As of the spring of 2003, the dollar amounts for damages for 2003 had already surpassed the entire dollar value lost the previous year. In addition to resulting in business disruption and a tremendous financial impact, such attacks form the basis of the most common security breaches in networks and communications today.

Initially, most attacks seemed to be originated out of a curiosity of what would result. However, as time goes on, and the profit margin in this type of activity increases, even more malicious attacks will be seen. As the more organized crime element gets involved with the individuals who know how to implement malicious code attacks and do not particularly care about the impact, we are likely to see these attacks focused on particular companies or particular parts of the government in order to cause calculated disruption in that area. For example, if some miscreant wanted to take an Internet based company, such as Ebay, offline for a number of days, thereby disrupting the business and its revenue stream or even manipulating the company's stock price, an assault of their systems may be mounted using malicious code.

There are a number of companies that provide anti-virus solutions, such as McAfee, Norton, Trend Micro, Soffos, F-Secure, etcetera. The solutions that are currently available today are software programs which, when deployed, are resident on a host system, such as a user's personal computer or laptop (collectively referred to a PCs) or on an electronic mail server to clean messages as they come into the server itself. Accordingly, these solutions are commonly called host based systems, and do not provide network based or inline devices that scan and scrub traffic as it comes into a network or leaves a network, but rather provide protection at one particular point.

It is incumbent upon the user or network administrator to maintain the updated protection files from the source of the anti-virus software program, such as from McAfee, Norton, Trend Micro, Soffos, or F-Secure (there is often a monthly fee or an annual fee for maintenance and support for that product). Accordingly, these products are only as effective as the last update that they have had. Managing and maintaining a large base of anti-virus software programs, such as anti-virus software programs installed upon individual network workstations, can be difficult and time consuming.

It should be appreciated that once the malicious code reaches the server, whether a post office protocol (POP), e.g., POP3 protocol, Internet message access protocol (IMAP), or other server configuration, the malicious code is typically already resident in the electronic mail. For example, one of the most traditional ways malicious code is able to penetrate commonly available defenses is through the use of off-line systems which are later reconnected to the network. A business traveler may be offsite, such as at a hotel or client site, and connect to a foreign network, such as a public network, to conduct business or download electronic mails. This traveler may unknowingly receive malicious code, such as because he has not yet received anti-virus updates due to his travels, because he has connected to an unprotected mail server, etcetera. When the business traveler returns to his office and again plugs their laptop into the business' network, they may be plugging in behind their firewall and behind their mail server, so everything that is on that laptop has not had a chance to be cleaned by the resident electronic mail or anti-virus program. This provides the malicious code the opportunity to contaminate the rest of the network, such as by replicating itself and going from the inside of the network out.

BRIEF SUMMARY OF THE INVENTION

The present invention is directed to systems and methods which examine information communication streams to identify and/or eliminate malicious code, while allowing "good" code to pass unaffected. Preferred embodiments of the present invention provide network based or inline devices that scan and scrub information communication in its traffic pattern, e.g., as information communication packets come into a network or leave a network or otherwise are passed via a network. For example, systems of the present invention may be deployed in line with or "in front of" various network systems to intercept information communication traffic and clean it or scrub it of any malicious code before it enters vulnerable systems. Additionally or alternatively, systems of the present invention may be utilized with respect to data egress, thereby preventing and containing malicious code from exiting the network where the contamination exists, and causing damage or disruption to business to other enterprises.

Embodiments of the present invention are adapted to accommodate various information communication protocols, such as simple mail transfer protocol (SMTP), post office protocol (POP), hypertext transfer protocol (HTTP), Internet message access protocol (IMAP), file transfer protocol (FTP), domain name service (DNS), and/or the like. Moreover, embodiments of the present invention may accommodate variations on particular protocols, such as file sharing protocols (e.g., Kazaa) which "piggy-back" on top of HTTP or other base protocols. Additionally or alternatively, routing protocols, such as hot standby router protocol (HSRP), border gateway protocol (BGP), open shortest path first (OSPF), enhanced interior gateway routing protocol (EIGRP), and/or the like. However, the present invention is not limited to operation with respect to particular protocols. For example, embodiments of the present invention operate to provide spam filtering, e.g., filtering of unsolicited and/or unwanted communications.

According to one embodiment of the invention, a protection system is introduced into the communication path between an electronic mail client and an electronic mail server. Packets directed to/from such clients and servers will be detoured to an appropriate subsystem, such as a virus scanning subsystem, before reaching their intended destination. The packets of an embodiment will be assembled into a message, or message subpart, by a proxy for operation of anti-virus functionality. The anti-virus functionality may operate to detect a virus in the message, clean the message of the virus, delete an infected message, etcetera. Packets having been cleaned or which do not receive cleaning are passed by the proxy on to the originally intended recipient.

It should be appreciated that embodiments of the present invention are disposed in an information communication data pathway, e.g., inline with network data traffic, providing monitoring and filtering of packets for malicious code which is transparent to network users. An advantage provided according to embodiments of the present invention is that malicious code is detected and removed before the message ever resides on a system for which protection is provided.

Preferred embodiments of the present invention do not present a network addressed appliance or interface (also referred to herein as "ZERO FOOTPRINT TECHNOLOGY™") with respect to malicious code analysis functionality. Accordingly, an invisible solution is provided wherein hackers cannot compromise the protective aspects of the system.

Embodiments of the present invention provide an interface for utilizing commercially available anti-virus software, or other malicious code analysis functionality. Accordingly, embodiments of the invention avoid a need to independently develop such functionality and/or facilitate rapid implementation of such functionality as it is introduced into the market.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWING

For a more complete understanding of the present invention, reference is now made to the following descriptions taken in conjunction with the accompanying drawing, in which.

DETAILED DESCRIPTION OF THE INVENTION

Figure 1:
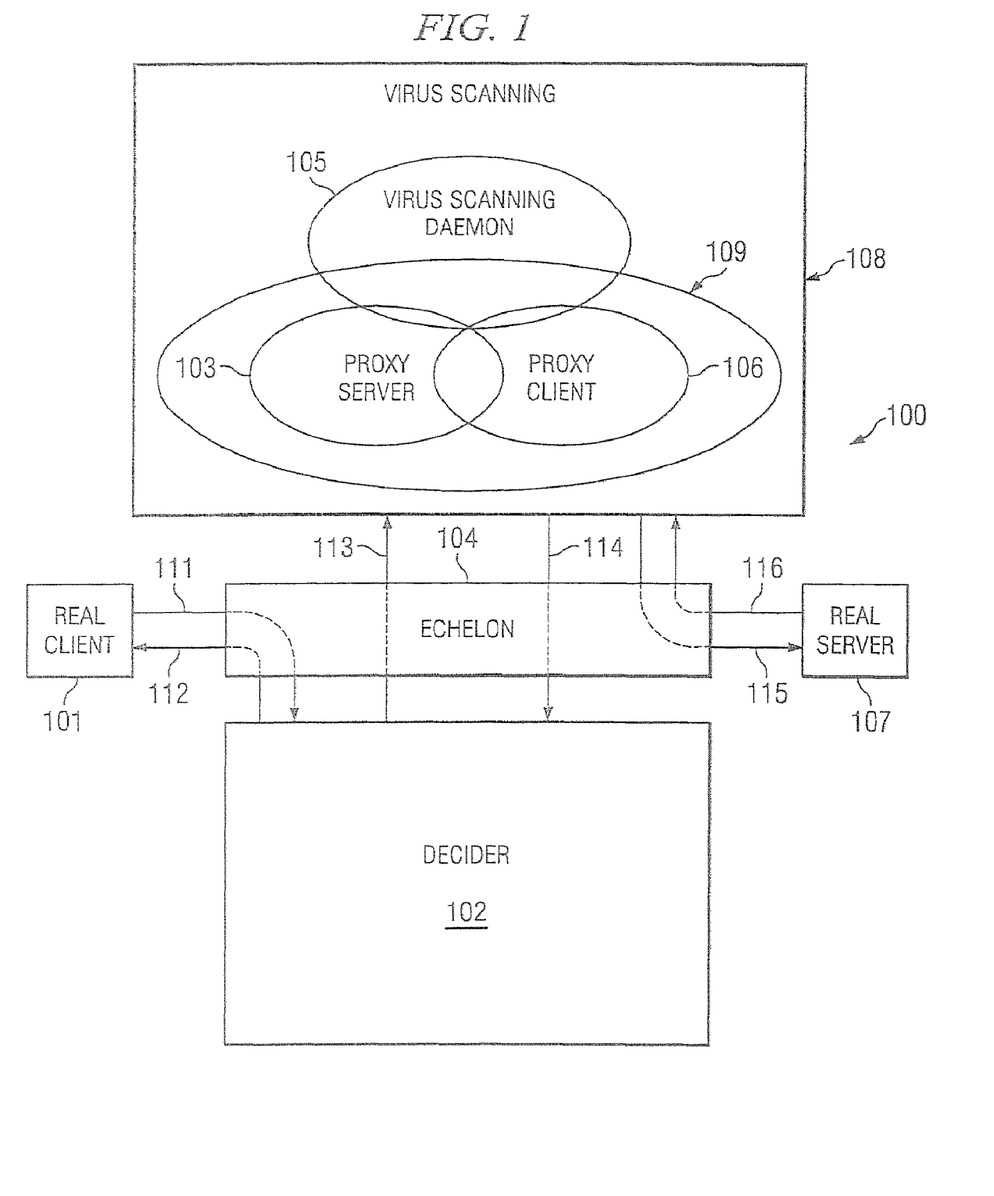
FIG. 1 shows a system including a protective system operable according to an embodiment of the present invention.

Directing attention to FIG. 1, system 100 configured according to an embodiment of the present invention is shown. System 100 includes real client 101, such as may comprise an electronic mail client (e.g., OUTLOOK) operable upon a user's PC, and real server 107, such as may comprise an electronic mail server (e.g., EXCHANGE) operable upon a network server, as is well known in the art. Real client 101 represents an actual source or intended destination of an information communication, such as the transmitter of an electronic mail message or a receiver of an electronic mail message. Real server 107 represents an actual server providing information communication services with respect to real client 101, such as an electronic mail server using POP or IMAP mail protocols. Real client 101 may be associated with real server 107, such as comprising a part of a LAN disposed at a business location, or may not be associated with real server 107, such as where real client 101 is transmitting a message via the Internet to another real client (not shown) associated with real server 107.

The illustrated embodiment disposes a protective system or systems of the present invention in the traffic pattern between real client 101 and real server 107. As shown in FIG. 1, there are three main functional components to a preferred embodiment protective system of the present invention. Specifically, there is virus scanning engine 108, echelon module 104, and decider module 102 which cooperate to examine information communication streams to identify and/or eliminate malicious code. Of course, alternative embodiments may comprise less than all the aforementioned functional components and/or additional functional components, if desired. It should be appreciated that when used in context with the illustrated embodiment of virus scanning engine 108, the term virus may include any form of malicious code, including but not limited to viruses, Trojans, and worms.

Virus scanning engine 108 (also referred to herein as a malicious code analyzer) preferably includes a proxy, such as proxy 109 shown including sub-functions proxy server 103 and proxy client 106, for interacting with information communication packets and providing suitable information for use with malicious code scanning and/or elimination functionality, such as virus scanning daemon 105. A proxy of virus scanning engine 108 preferably proxies multiple ports. For example, if the same service is offered on multiple ports, embodiments of the present invention will not proxy just one of the ports it serves, but rather will proxy multiple ports, thereby allowing an amount of flexibility in network implementations. A proxy of virus scanning engine 108 are preferably multi-threaded, thereby providing faster operation as described herein.

Figure 2:
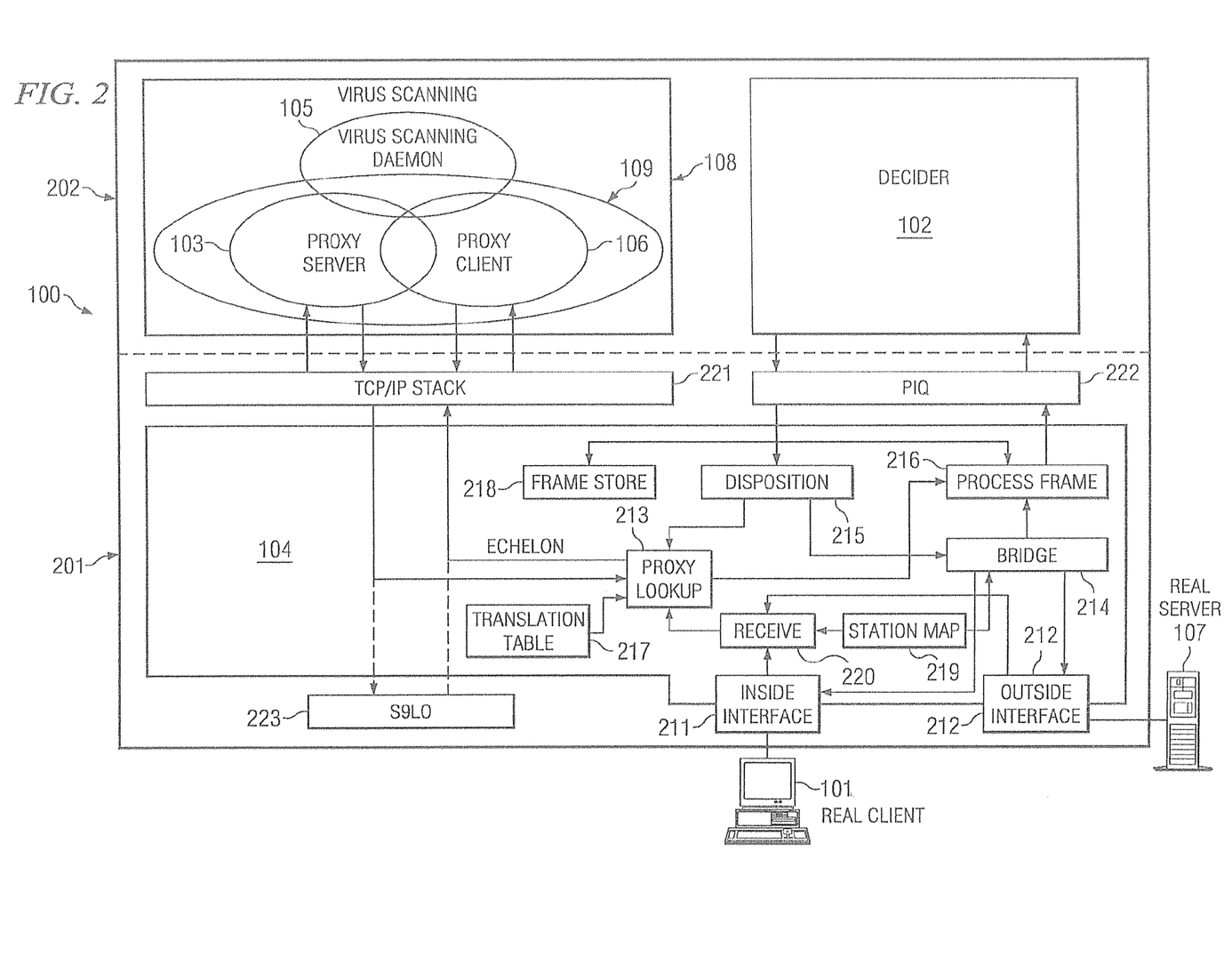
FIG. 2 shows further detail with respect to an embodiment of the protective system of FIG. 1.

Decider module 102 (also referred to herein as a communications throttle) preferably provides logic for analyzing data packets to determine which should be passed, which should be blocked, and/or which should be redirected. Accordingly, decider module 102 may be configured substantially as the systems and methods described in detail in the above referenced patent applications entitled "Intelligent Feedback Loop Process Control System," "System and Method for Traffic Management Control in a Data Transmission Network," and/or "System and Method for Detecting and Eliminating IP Spoofing. Preferably, decider module 102 of the illustrated embodiment includes decision logic operable to make a determination as to whether or not to proxy a particular packet. For example, if a packet is destined for a particular service that is proxied according to the present invention (e.g., sub-function proxy server 103 or proxy client 106 proxies the service), then rather than allowing the packet to pass straight through echelon module 104 (e.g., from inside interface 211 to outside interface 212), decider module 102 may cause the packet to be directed to the appropriate proxy before it is sent through to the intended destination.

Echelon module 104 (also referred to herein as a steering module) is preferably disposed in the information communication path and handles all the steering of the network traffic presented at inside interface 211 and outside interface 212. According to a preferred embodiment, echelon module 104 will operate under control of decider module 102 to allow data packets to pass therethrough, such as between real client 101 and real server 107, to block data packets, and/or to redirect data packets, such as to virus scanning engine 108.

According to a preferred embodiment, the protective systems of the present invention are configured to be transparent to users and network system operations. For example, embodiments of the invention provide a transparent virus, worm, and/or Trojan scanner. Such a transparent protective system implementation may be accomplished using a proxy configuration as described herein. In contrast to conventional proxy implementations, proxies of the present invention preferably exist without externally available network addresses. In a typical situation in which proxies are used, the proxy will have its own IP address so a user's client can point to the proxy instead of the actual server that is being proxied. A mail server may be proxied, such as to provide caching or management functionality, such that an electronic mail server communicates with the proxy instead of to the client and the client communicates with the proxy instead of the mail server. In order to install the proxy, the client and server must be reconfigured to direct their communications to the proxy. However, proxies utilized according to preferred embodiments of the present invention implement ZERO FOOTPRINT TECHNOLOGY™, wherein the proxy exists without an externally available network address, to present a protective system that is invisible on the network.

Proxies of the illustrated embodiment do not have an externally available IP address, yet receive every packet that passes through the protective system that are to be proxied according to the present invention. For example, by placing the interfaces, e.g., inside interface 211 and outside interface 212, in promiscuous mode, the processes of the protective system of a preferred embodiment is enabled to see all the traffic on the interface. In contrast to an interface operating in normal mode, which will only show messages that were addressed to the interface at the data link layer, an interface operating in promiscuous mode will show every packet that is on the wire. Accordingly, processes such as echelon module 104 may identify packets for processing according to the present invention, although they are not specifically addressed to the protective system or any process thereof, and redirect those packets to the proxies of virus scanning engine 108.

Echelon module 104, in cooperation with decider 102, preferably provides a proxy translate function that monitors each connection or flow and determines which connections are associated with a port being proxied according to embodiments of the present invention. For example, a configuration file may be set up in which information with respect to what ports are proxied is provided and echelon module 104 and/or decider module 102 may reference the configuration file for appropriate treatment of packets passed through the protective system.

The above described translate function not only renders the preferred embodiment proxies invisible, thereby making it very difficult for hackers to compromise the effectiveness of the protective system, but also facilitates a completely transparent deployment of the protective system. For example, real server 107 and real client 101 need not be reconfigured upon deployment of the protective system as the aforementioned translate function will autonomously handle packet detouring according to the present invention.

The aforementioned protective system transparency extends to operation with respect to the users of the information communication system. Although test configurations have shown that a finite amount of latency with respect to message transmission may be experienced, such latency is insufficient to be objectionable (and perhaps even unnoticeable) to users and has not been found to cause undesired operation, such as timeouts and resends. Embodiments of the present invention do not implement message store and forward techniques, but rather compile only enough packets at any particular time, e.g., message subparts, to facilitate scanning and/or redressing of malicious code. Embodiments of the present invention may, however, implement message store and forward techniques, if desired. For example, where complex protocols such as IMAP are supported, it may be desirable to compile a complete message within a protective system of the present invention for appropriate processing. Similarly, where anti-spam analysis and/or blocking is implemented, compiling a complete message may be desirable to avoid passing a portion of a message to a client before the message is identified as spam to be blocked.

In operation according to a preferred embodiment, a packet enters echelon module 104 disposed in the traffic pattern between real client 101 and real server 107. The packet may be transmitted, for example, by either of real client 101 or real server 107 and/or may be directed, for example, toward either of real server 107 or real client 101. When echelon module 104 recognizes a packet that is to be provided malicious code analysis using proxy 109, echelon module 104 preferably marks the packet as a packet to be proxied according to the present invention, e.g., a bit may be set in a header.

Once identified as a packet to be proxied, echelon module 104 may direct the packet for further analysis according to the present invention. For example, path 116 illustrates the path of a packet transmitted by real server 107 which is identified by echelon module 104 for malicious code analysis by virus scanning engine 108 using proxy 109. Embodiments of the present invention implement traffic management control, such as may provide a determination as to whether a packet should be passed further, blocked, stored and forwarded, etcetera, and therefore echelon module 104 may direct the packet (or information with respect thereto) to processes other than virus scanning engine 108, such as decider module 102, for further analysis. Path 111 illustrates the path of a packet transmitted by real client 101 which, although being identified by echelon module 104 for malicious code analysis using proxy 109, is initially directed to decider module 102. Thereafter, if decider module 102 determines that the packet is one which should be passed by the protective system, decider module 102 will preferably control echelon module 104 to route the packet to virus scanning engine 108 (path 113) to allow the appropriate function of proxy 109 (e.g., sub-function proxy server 103 or sub-function proxy client 106) to receive the packet. It should be appreciated that analysis of a data packet beyond that provided by virus scanning engine 108 may be provided before and/or after processing by virus scanning engine 108. Path 114 illustrates echelon module 104 directing a packet transmitted by real server 107 to decider 102 after analysis by virus scanning engine 108. After processing by the protective system, packets are preferably directed to their intended destinations (passed by the protective system) by echelon module 104 (paths 112 and 115).

Decider module 102 of the preferred embodiment determines whether or not particular traffic is to be passed, as mentioned above. Such determinations may be based on flow specifications, such as may describe how much bandwidth is in use or available, the byte or packet traffic a particular conversation or system is allowed, etcetera. Flow specifications for determining whether or not to pass particular traffic are shown and described in further detail in the above referenced patent applications entitled "Intelligent Feedback Loop Process Control System" and "System and Method for Traffic Management Control in a Data Transmission Network." According to preferred embodiments of the present invention, such determinations are made on the side of the conversation that initiates the conversation (e.g., real client 101 in the example shown in FIG. 1).

According to a preferred embodiment, proxy 109 (e.g., using proxy server 103 and proxy client 106) operates to emulate an appropriate packet destination host for malicious code analysis. For example, where a packet is transmitted from real server 107 to real client 101, sub-function proxy client 106 may be utilized with respect to the packet to emulate reception of the packet by real client 101 and facilitate malicious code analysis. Similarly, where a packet is transmitted from real client 101 to real server 107, sub-function proxy server 103 may be utilized with respect to the packet to emulate reception of the packet by real server 107 and facilitate malicious code analysis. A proxy of virus scanning engine 108 may operate to collect any number of pieces of a message, e.g., multiple packets, in order to provide malicious code analysis. After providing malicious code analysis, e.g., malicious code identification and elimination, the packet may be again returned, perhaps scans any identified malicious code, to echelon module 104 by virus scanning engine 108 for routing to its proper destination.

According to one embodiment of the invention, a proxy of virus scanning engine 108 comprises a proxy substantially as is well known in the art, but which has been adapted to interface with the network via the aforementioned proxy translation function. Loop back interfaces are preferably utilized according to the present invention to facilitate a proxy communicating with the rest of the protective system using a proxy translation function.

As discussed above, a proxy of the illustrated embodiment comprises two sub-functions, a server proxy function (proxy server 103) and a client proxy function (proxy client 106). The server proxy function of the illustrated embodiment accepts the connections from a client and performs operations to emulate a real server, such as mimicking a handshake with a real server, while communicating with a client. The client proxy function of the illustrated embodiment accepts the connections from a server and performs operations to emulate a real client. The use of such proxy functions to emulate connections is desirable because communication protocols, such as transport control protocol (TCP), often expect a certain amount of handshaking or other interaction in establishing and/or maintaining a connection. Moreover, particular message protocols, such as may be provided on top of an underlying communication protocol, such as the above mentioned mail protocols, often expect certain messages or commands to be passed back and forth to establish and/or maintain a connection. In order to facilitate receiving information sufficient for malicious code analysis, such as by acquiring an entire message or conversation from a client, embodiments of the present invention utilize the aforementioned proxy to send appropriate responses back to the transmitting client or server. It should be appreciated that operation of proxies according to embodiments of the present invention facilitate reception of an electronic mail message by the protective system without actually allowing the intended recipient, whether a client or a server, to receive even a portion of an infected message.

According to one embodiment, the aforementioned proxies accept scannable pieces of an electronic mail message, such as the body of the electronic mail message, an attachment thereto, mime encoded message sections, and/or the like, and feed those pieces into a malicious code analyzer, such as may comprise virus scanning daemon 105. The malicious code analyzer preferably accumulates appropriate ones of these pieces in order to do an analysis, and then when completed with its analysis, returns a result that indicates the pieces either passed or failed and/or operates to eliminate or otherwise render harmless any malicious code.

If malicious code is detected the protection system may proceed according to several options. For example, virus scanning daemon 105 may operate to fix the damaged piece of the message, e.g., remove the malicious code and leave usable good code (scrub the message), if the virus scanning daemon 105 is capable of doing so. Alternatively, virus scanning daemon 105 may determine that it is unable to repair the message without the malicious code attached and, therefore, virus scanning daemon 105 may generate a message to replace the original message indicating that malicious code was identified and the original message has been quarantined. This replacement message may include some information from the original message, such as identification of the transmitter, information with respect to the content of the message, etcetera.

Although virus scanning daemon 105 utilized according to embodiments of the present invention may comprise a propriety, or otherwise uniquely configured, malicious code analysis program, preferred embodiments of the present invention utilize commercially available software programs, such as the aforementioned anti-virus solutions available from McAfee, Norton, Trend Micro, Soffos, F-Secure, etcetera. For example, virus scanning daemon 105 may provide hooks, or other software links, to interface commercially available anti-virus software programs with proxy 109, thereby providing an embodiment of virus scanning daemon 105 comprising an anti-virus software program and virus scanning engine proxy interface. Additionally or alternatively, virus scanning daemon 105 may comprise a combination of proprietary and commercially available malicious code detection means. For example, commercially available anti-virus software programs may be utilized with respect to one embodiment of virus scanning daemon 105 due to their widespread availability while proprietary anti-span software programs may be utilized with respect to such an embodiment of virus scanning daemon 105 due to their relatively limited commercial availability.

The aforementioned embodiment, wherein an interface is provided to utilize commercially available anti-virus software programs, provides advantages in that a user is free to implement their choice of anti-virus protection using a protective system of the present invention. Moreover, implementation of a protective system of the present invention does not require redevelopment of otherwise available functionality nor separate maintenance and updating of the anti-virus aspect. Likewise, as the sophistication of viruses evolves, embodiments of the present invention will be able to be current with new products in the market that are highly specialized.

It should be appreciated that, although such an embodiment utilizes an otherwise commercially available anti-virus software program, functional advantages of the present invention are still realized. For example, the disposition of the protective system in the traffic pattern and utilization of the aforementioned proxy provides for an improved form of malicious code analysis as the malicious code is prevented from ever reaching its destination. Additionally, the proxy translate function of preferred embodiments of the present invention results in disposing of the anti-virus software programs in an environment invisible and inaccessible to hackers as well as users, thereby rendering it substantially more difficult to defeat.

Directing attention to FIG. 2, further detail with respect to an embodiment of system 100 of FIG. 1 is shown. In the embodiment of FIG. 2, echelon module 104 is disposed in operating system kernel space 201 and decider module 102 and virus scanning engine 108 are disposed in application space 202. However, it should be appreciated that embodiments of the present invention may be configured differently than the illustrated embodiment. For example, in a particular operating system environment, such as LINUX, some or all of echelon module 104 may be disposed in application space, whereas in another operating system environment, such as SOLARIS, echelon module 104 may be disposed in the operating system kernel space as shown.

Real client 101 in the embodiment of FIG. 2 is disposed on a network associated with the protective system (e.g., a LAN, MAN, WAN, or intranet) and is coupled to "inside" interface 211. Real server 107 in the embodiment of FIG. 2 is disposed on a network not associated with the protective system (e.g., the Internet) and is coupled to "outside" interface 212. Of course, systems either associated with or not associated with the protective system may be coupled to either of inside interface 211 or outside interface 212, depending upon the particulars of a network configuration. However, according to a preferred embodiment, the protective system is disposed at a protected network's edge, thereby associating inside interface 211 with the systems of the protected network and outside interface 212 with the systems external thereto.

As an example of operation according to system 100 as illustrated in FIG. 2, real client 101 may be retrieving a message from real server 107. Accordingly, the information communication conversation begins on the client side and arrives at inside interface 211. Proxy lookup 213 preferably checks translation table 217 to determine if this connection is part of a proxy conversation that already exists. As the conversation is just being initialized, proxy lookup 213 determines that it currently is not part of a proxy conversation and, accordingly, process frame 216 processes the packet further according to an embodiment of the invention.

Station map 219 of embodiments of the present invention stores information with respect to addresses of systems communicating on a network or networks served by a protection system comprising echelon module 104, decider module 102, and virus scanning engine 108. For example, station map 219 may store Ethernet media access controller (MAC) addresses, much the way a network bridge or switch would keep track of such addresses, for use in determining how the packet should be directed by echelon module 104. In the case of a packet arriving at inside interface 211 and being directed to an address coupled to outside interface 212, as may be determined using station map 219, processing by decider module 102 and/or virus scanning engine 108 may be desired. However, in the case of a packet arriving at inside interface 211 and being directed to an address also coupled to inside interface 211, as may be determined by receive 220 using station map 219, processing by decider module 102 and/or virus scanning engine 108 may be foregone, such as depending upon a level or mode of protection implemented.

Process frame 216 of a preferred embodiment stores a copy of the packet in frame store 218 for use when it is determined by decider module 102 that it is to be passed or further processed. Process frame 216 may operate to send the packet and/or metadata associated with the packet on to decider module 102 for it to make its decision on whether or not that packet should be passed or blocked. In the current example, decider module 102 of the preferred embodiment will determine that the packet is to be passed rather than blocked. Decider module 102 will further preferably determine that the packet from real client 101 initiating a message retrieval from real server 107 is associated with one of the ports proxied by the protection system and, therefore, will preferably give it a disposition that indicates that the packet is to be proxied.

It should be appreciated that, in addition to or in the alternative to determining which packets are to be passed by the protective system, as described above, various other processes may be implemented with respect to such packets. For example, a process residing in the application space, such as decider module 102, may provide forensic capture functionality, such as to retain a copy of the packets for analysis later. Particular functionality, such as forensic analysis, may be difficult to implement in the operating system kernel space, thus resulting in PIQ 222 of the illustrated embodiment facilitating enhanced processing and functionality.

The illustrated embodiment utilizes packet information queue (PIQ) 222 to pass packets, and/or information associated therewith (e.g., metadata), between echelon module 104 and decider module 102. PIQ 222 of the illustrated embodiment provides an interface between operating system kernel space 201 and application space 202. Accordingly, echelon module 104 can place packets, and/or information associated therewith, in PIQ 222 in order for processes, such as decider module 102, operating in the application space can see the packet and/or its attendant data. Additionally, PIQ 222 of the illustrated embodiment provides a mechanism for providing decisions or other information with respect to packets by processes, such as decider module 102, operating in the application space back down to processes operating in the operating system kernel space, such as echelon module 104. Embodiments of PIQ 222 essentially provide a drop box, such as in the form of a circular queue, to pass packets, and/or information associated therewith, from the interfaces up to decider and back.

Disposition 215, which recognizes the disposition given the packet by decider module 102, may retrieve the packet from frame store 218 for further processing. Disposition 215 may, for example, send the packet to bridge 214 or proxy lookup 213 for further processing as described herein.

Proxy lookup 213 will preferably build a set of translations for mapping addresses, stored in translation table 217, when a suitable set of translations does not already exist for use with the particular packet. For example, the packet may initially be addressed with the real client address and the real server address. These addresses may be mapped by proxy lookup 213 to a set of addresses for going from real client 101 to proxy 109, from proxy 109 to real client 101, from proxy 109 to real server 107, and from real server 107 to proxy 109, thereby establishing four paths associated with the message.

Once the aforementioned mapping entries are created, proxy lookup 213 preferably passes the packet up through TCP/IP stack 221 to virus scanning engine 108. TCP/IP stack 221 is utilized in interfacing virus scanning engine 108 according to a preferred embodiment in order to provide a standard network interface to the proxies. In order to facilitate communication through TCP/IP stack 221 according to a preferred embodiment, a loop back interface, e.g., SLEUTH NINE™ loop (S9LO) 223, is utilized which allows normal socket calls to work. For example, where echelon module 104 is implemented in the Sun Microsystems SOLARIS operating system, a loop back interface may be created for use according to the present invention such as by creating a loop back driver to provide access to the stream of traffic between the driver and the stack. For example, a kernel module may be inserted in the stream to intercept the packets, allowing steering of the packets using the stream module up and down the loop back connections and into the rest of the kernel module for getting to the real network interfaces. However, where the Free Software Foundation LINUX operating system is utilized, for example, the provided internal loop back functionality may be used, such as by implementing PF_PACKET, raw sockets, and IP tables.

It should be appreciated that the loop back interfaces utilized according to preferred embodiments of the present invention are not required for a functional implementation. For example, proprietary interfaces may be developed to provide connectivity between virus scanning engine 108 and echelon module 104, if desired. However, embodiments of the present invention implement proxies which are adapted to communicate with a network connection. This proxy configuration attribute may be leveraged to utilize a network stack (e.g., TCP/IP stack) which the operating system provides to implement an interface between the packets below the network stack and the applications (proxies) above the network stack. The aforementioned loop back interfaces essentially fake a connection from the bottom of the network stack to provide an interface useful according to embodiments of the present invention. Special addresses on the loop back interface may be utilized to bind the proxies and to essentially create a virtual connection for their communication. Using such a loop back configuration, the proxies may be configured to communicate with a real host although packets are being passed to processes of the present invention.

Proxy 109 sub-function proxy server 103 preferably has a thread waiting on an accept call to accept the message and determine how the message should be handled. Preferably, the appropriate proxy determines if the corresponding real host is available. In the above example, proxy 109 sub-function proxy client 106 will attempt to establish a connection with real server 107 to determine if the real server is available for the conversation being initiated by real client 101. The preferred embodiment protection system does not store messages for later delivery and, therefore, if the corresponding real host is not available for a communication session, the proxies of virus scanning engine 108 will emulate a failed connection to the host giving the same result as if the protection system had not been implemented.

In processing packets associated with a conversation, normal commands, such as authentication, are propagated through the proxy, through the proxy lookup and the appropriate interface to relay responses. In the above example, proxy 109 may pass the packet to proxy lookup 213 for transmission to real server 107 through outside interface 212. According to a preferred embodiment, all packets going to and from the server side functionality (proxy server 103) of proxy 109 go through decider 102 regardless of which interface is used. However, according to this embodiment, all packets going to and from the client side functionality (proxy client 106) of proxy 109 do not pass through decider 102 regardless of which interface is used.

When information to be analyzed (e.g., scanned) by virus scanning daemon 105 is identified, such as a mail message and/or its associated attachment, the packets coming from real client 101 will preferably continue to be acknowledged as received by sub-function proxy server 103 of proxy 109, which will read the packets to recognize when a suitably complete piece of the message (perhaps the entire message) has been assembled to allow proper scanning, analysis, and/or repair by virus scanning daemon 105. Accordingly, it should be appreciated that the message packets subsequent to the initial packet discussed above, repeat the above described path through inside interface 211 proxy lookup 213, process frame 216, decider module 102, disposition 215, proxy lookup 213, and virus scanning engine 108 according to embodiments of the invention.

Virus scanning daemon 105 may determine that nothing is to be done with respect to the analyzed message (comprised, for example, of one or more packets), that malicious code is to be removed from the message or one or more parts thereof, or that malicious code is present but is such that removal is impossible. In the first and second of the above cases, the unchanged message (first case) or scrubbed message (second case) may be passed on to real server 107, such as by transmission of packets following the path described above with respect to normal commands. In the third of the above cases, a new message indicating that the original message contained malicious code and was quarantined may be generated and the associated packets may be passed on to real server 107, such as following the path described above.

It should be appreciated that the actual and/or complete packets need not be passed between one or more of the functional blocks of FIG. 2, such as where packets are to be bridged and when packets are processed by decider module 102. As mentioned above, frame store 218 stores a copy of the packet as received by echelon module 104. Accordingly, a disposition associated with a particular packet may be provided to and/or returned from decider module 102 in situations where the packet is to be passed by the protection system. For example, when decider module 102 determines that a packet should be passed, decider module 102 may send a disposition message for the packet to echelon module 104 via PIQ 222. Disposition 215 utilizes frame store 218 to retrieve such packets at a point in the path more near the output, thereby avoiding unnecessary passing of packets between functional blocks.

According to one embodiment of the invention, disposition 215 and bridge 214 may operate with respect to a packet send function of echelon module 104 to avoid unnecessary passing of complete packets. According to such an embodiment, when decider module 102 determines that a particular packet should be passed, disposition 215 may retrieve the packet identified by decider module 102 from frame store 218 and pass the packet to bridge 214. Bridge 214 may then utilize station map 219 to determine which of interfaces inside interface 211 and outside interface 212 the packet is to be sent through, and transmit the packet accordingly.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A system for providing protection against malicious code, said system comprising:
   a malicious code analyzer disposed in a communication system traffic pattern between an originator of an information communication of said communication system traffic pattern and an intended recipient of said information communication to intercept said information communication and to analyze said information communication for malicious code, said malicious code analyzer being configured to be transparent to systems of said communication system in that the malicious code analyzer does not have a network address associated therewith which is visible external to said system;
   a steering module between a first interface and a second interface of said system, the steering module being configured to monitor each information communication provided to said first interface and said second interface and to direct at least some of said information communication to said malicious code analyzer; and
   a communications throttle for determining if said information communication is to be passed by said system.

2. The system of claim 1, wherein said transparent configuration of said malicious code analyzer comprises:
   a translate function that monitors each packet provided to an interface of said system for packets to be provided malicious code analysis by said malicious code analyzer.

3. The system of claim 1, wherein said malicious code analyzer comprises:
   a proxy for emulating a behavior of a destination of said information communication.

4. The system of claim 3, wherein said transparent configuration of said malicious code analyzer renders said proxy invisible to devices coupled to said system.

5. The system of claim 3, wherein said proxy comprises:
   server functionality; and
   client functionality.

6. The system of claim 3, further comprising:
   a loop back interface for interfacing said information communication with said malicious code analyzer.

7. The system of claim 1, wherein said malicious code analyzer comprises:
   code for virus scanning.

8. The system of claim 1, wherein said malicious code analyzer comprises:
   codes for identifying unwanted or unsolicited messages.

9. The system of claim 1, wherein said information communication conforms to a
   protocol selected from the group consisting of:
      simple mail transfer protocol (SMTP);
      post office protocol (POP);
      hypertext transfer protocol (HTTP);
      Internet message access protocol (1MAP);
      file transfer protocol (FTP);
      domain name service (DNS);
      hot standby router protocol (HSRP);
      open shortest path first (OSPF); and
      enhanced interior gateway routing protocol (EIGRP).

10. A system comprising:
    a first computer that is a source of information communication;
    a second computer that is an intended recipient of the information communication; and
    a protective system disposed in a traffic pattern between the first computer and the second computer, the protective system including a malicious code analyzer configured to analyze the information communication for malicious code and is transparent to the first computer and the second computer in that the malicious code analyzer does not have a network address associated therewith which is visible external to the protective system, a steering module between a first interface and a second interface of the protective system and is configured to monitor communications between the first computer and the second computer and to direct at least some of the information communication to the malicious code analyzer, and a communications throttle for determining if the information communication is to be passed by the protective system.

11. The system of claim 10, wherein the malicious code analyzer comprises a proxy for emulating a behavior of a destination of the information communication.

12. The system of claim 11, wherein the proxy is invisible to the first computer and the second computer.

13. The system of claim 11, wherein said proxy comprises:
    server functionality; and
    client functionality.

14. The system of claim 10, wherein the malicious code analyzer comprises:
    code for virus scanning.

15. The system of claim 10, wherein the malicious code analyzer comprises:
    codes for identifying unwanted or unsolicited messages.

16. The system of claim 10 wherein the first computer comprises an electronic mail client and the second computer comprises an electronic mail server.

* * * * *